(12) United States Patent
Emberty et al.

(10) Patent No.: US 6,466,540 B1
(45) Date of Patent: Oct. 15, 2002

(54) SELF-HEALING COUPLER FOR A SERIAL RAID DEVICE

(75) Inventors: Robert George Emberty; Craig Anthony Klein; Edward Joseph Pawlowski, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/305,398

(22) Filed: May 5, 1999

(51) Int. Cl.[7] .............................. H04J 1/16; H04J 3/14
(52) U.S. Cl. ...................................... 370/222; 370/216
(58) Field of Search .................... 370/216, 217, 370/218, 221, 222, 241, 242, 244, 245, 254; 714/2, 1, 3, 7

(56) References Cited

U.S. PATENT DOCUMENTS

| | | | | |
|---|---|---|---|---|
| 4,905,230 A | * | 2/1990 | Madge et al. | 370/221 |
| 4,914,656 A | | 4/1990 | Dunphy, Jr. et al. | |
| 4,973,955 A | * | 11/1990 | Avaneas | 270/222 |
| 4,989,206 A | | 1/1991 | Dunphy, Jr. et al. | |
| 5,361,250 A | * | 11/1994 | Nguyen et al. | 370/221 |
| 5,390,187 A | | 2/1995 | Stallmo | |
| 5,479,653 A | | 12/1995 | Jones | |
| 5,539,727 A | * | 7/1996 | Kramarczyk et al. | 370/222 |
| 5,708,668 A | | 1/1998 | Styczinski | |
| 5,812,761 A | | 9/1998 | Seki et al. | |
| 6,028,837 A | * | 2/2000 | Miller | 370/222 |
| 6,088,141 A | * | 7/2000 | Merli et al. | 359/110 |
| 6,201,995 B1 | * | 3/2001 | Ying | 700/3 |
| 6,219,335 B1 | * | 4/2001 | Luk et al. | 370/222 |

* cited by examiner

Primary Examiner—Ajit Patel
(74) Attorney, Agent, or Firm—Robert M. Sullivan; Bracewell & Patterson, L.L.P.

(57) ABSTRACT

A self-healing coupler for a serially linked device that is serially coupled to other devices. The serially linked device has a communication input and a communication output. When a break occurs between a first serially linked device and other devices, as indicated by a lack of communication output from the first serially linked device, the self-healing coupler by-passes the break in the first serially linked device to maintain communication between the other devices. The invention is particularly suited to maintaining communication to serial Redundant Array of Inexpensive Disks (RAID) storage devices.

17 Claims, 3 Drawing Sheets

SELF-HEALING COUPLER FOR A SERIAL RAID DEVICE

BACKGROUND OF THE INVENTION

1. Technical Field

The present invention relates in general to a self-healing coupler for a serial RAID device and in particular to a self-healing coupler for a serial storage architecture wherein the self-healing coupler by-passes any disk drive or drives in which communication or link has been broken and re-couples to allow and maintain the serial link between all remaining disk drives. Still more particularly, the present invention relates to a switching device for a serial device that switches to a by-pass mode to by-pass the serial device when communication or link of the device has been broken and to an in-line mode for maintaining the device as serially linked to the other devices when communication or link of the device is active and has been maintained.

2. Description of the Related Art

FIG. 1 shows a conventional serial storage architecture (SSA) RAID system 10. The SSA RAID system 10 has a number of target disk drives 12 (i.e. targets 1, 2, and 3 as shown in FIG. 1) serially linked together, and the target drives 12 are linked to a SSA initiator 14. Problems arise when a break in communication or link occurs at any of the target drives 12. FIG. 1 shows that a break 18 of communication or link has occurred at target 1. The serial communication or link has therefore been broken between target 1 and the other serially linked devices, targets 2 and 3, and the SSA initiator 14 and a host computer in communication with the SSA initiator 14 may no longer be able to access the other serially linked target drives 2 and 3, such as to access the data stored therein. Therefore, the other serially linked target drives, such as target drives 2 and 3, typically cannot be accessed until the communication or link problem has been identified and fixed or another access route of the other serially linked target drives are configured. Also, when a break in communication or link occurs, the serial storage architecture is not maintained, and thus the host computer may not be able to recognize the SSA RAID system 10.

It would therefore be advantageous and desirable to have a device for maintaining the serial link between devices when a break in communication or link at one of the devices has occurred. It would also be advantageous and desirable to provide switching of a serial device with a communication or link problem from an in-line mode in which the serial device is serially linked to other devices to a by-pass mode in which the serial device is by-passed and the other devices are re-coupled and serially linked together. It would be advantageous and desirable to provide a self-healing coupler for a serial storage architecture wherein the self-healing coupler by-passes any disk drive or drives in which communication or link has been broken and re-couples and serially links all remaining active disk drives.

SUMMARY OF THE INVENTION

It is therefore one object of the present invention to maintain the serial link between devices when a break in communication or link at one of the serially linked devices has occurred.

It is another object of the present invention to by-pass any serially linked disk drive or drives in which communication or link has been broken and re-couples to maintain serial link between all remaining disk drives.

It is yet another object to self-heal the coupling in a serial storage architecture when a communication or link has been broken wherein any serial device or disk drive or drives in which communication or link has been broken is by-passed and all remaining active devices and disk drives are re-coupled to maintain serially link between the devices.

It is another object of the present invention to provide an override system for manually controlling a serially linked device in a by-pass mode or an in-line mode.

The foregoing objects are achieved as is now described. A self-healing coupler for a serially linked device that is serially coupled to other devices. The serially linked device has a communication input and a communication output. The self-healing coupler has at least one switching device coupled to the communication input and the communication output of the serially linked device, a communication detection device coupled to the communication output of serially linked device for detecting continuous communication at the communication output, and a switch coupled to the at least one switching device. The switch controls at least one switching device. The serially linked device is maintained linked and in an in-line position to the other devices when the continuous communication has been detected at the communication output. The serially linked device is in a by-pass position from the other devices and the other devices are maintained as serially linked together when the continuous communication has not been detected at the communication output. The serially linked device has bi-directional communication lines. A pair of polarized communication lines provide communication in one direction through the serially linked device and another pair of polarized communication lines provide communication in another direction through the serially linked device. An override system is coupled to the switch to allow manual control of the switch in controlling the at least one switching device to manually maintain the serially linked device between the in-line position and the by-pass position.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
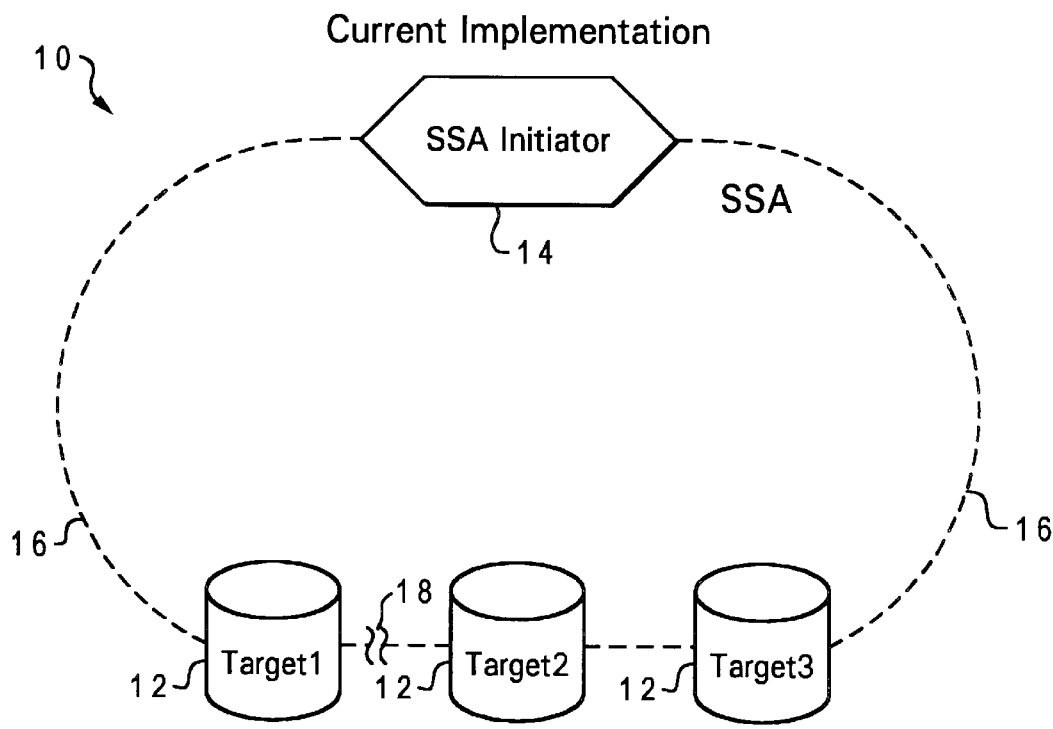
FIG. 1 is a block diagram of a conventional SSA RAID system having target disk drives serially linked together.

With reference now to the figures and in particular with reference to FIG. 1, a conventional serial storage architecture (SSA) RAID system 10 is shown. As stated earlier, the SSA RAID system 10 has a number of target disk drives 12 (i.e. targets 1, 2, and 3 as shown in FIG. 1) serially linked together, and the target drives 12 are linked to a SSA initiator 14. Problems as discussed earlier arise when a break in communication or link occurs at any of the target drives 12. FIG. 1 shows that a break 18 of communication or link has occurred at target 1.

Figure 2:
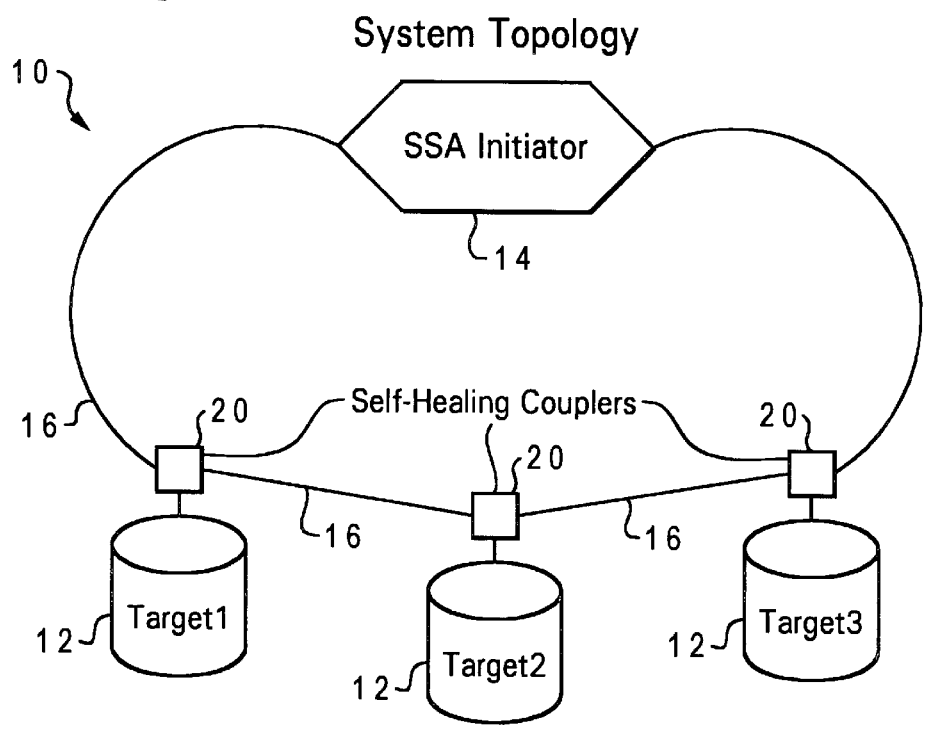
FIG. 2 is a block diagram of a SSA RAID system having self-healing couplers coupling and serially linking the target disk drives together.

With reference now to the figures and in particular reference to FIG. 2, a SSA RAID system 10 with self-healing couplers 20 coupling and serially linking the target disk drives 12, that is targets 1, 2, and 3, together is shown. Each self-healing coupler 20 acts as a switch. Each self-healing coupler 20 is switched to an "in-line" mode to couple the respective target disk drive 12 to the serial link 16 and to the other target disk drives 12 and the SSA initiator 14 when no break or problem in communication and link at the target disk drive 12 exists. On the other hand, each self-healing coupler 20 is switched to a "by-pass" mode to by-pass the respective target disk drive 12 and maintain the serial link 16 of the other target disk drives and the SSA initiator 14 when a break or problem in communication and link at the target disk drive 12 exists. Each self-healing coupler 20 also has an override system for manually controlling a serially linked device, such as the target disk drive 12, in a "by-pass" mode or an "in-line" mode.

Figure 3:
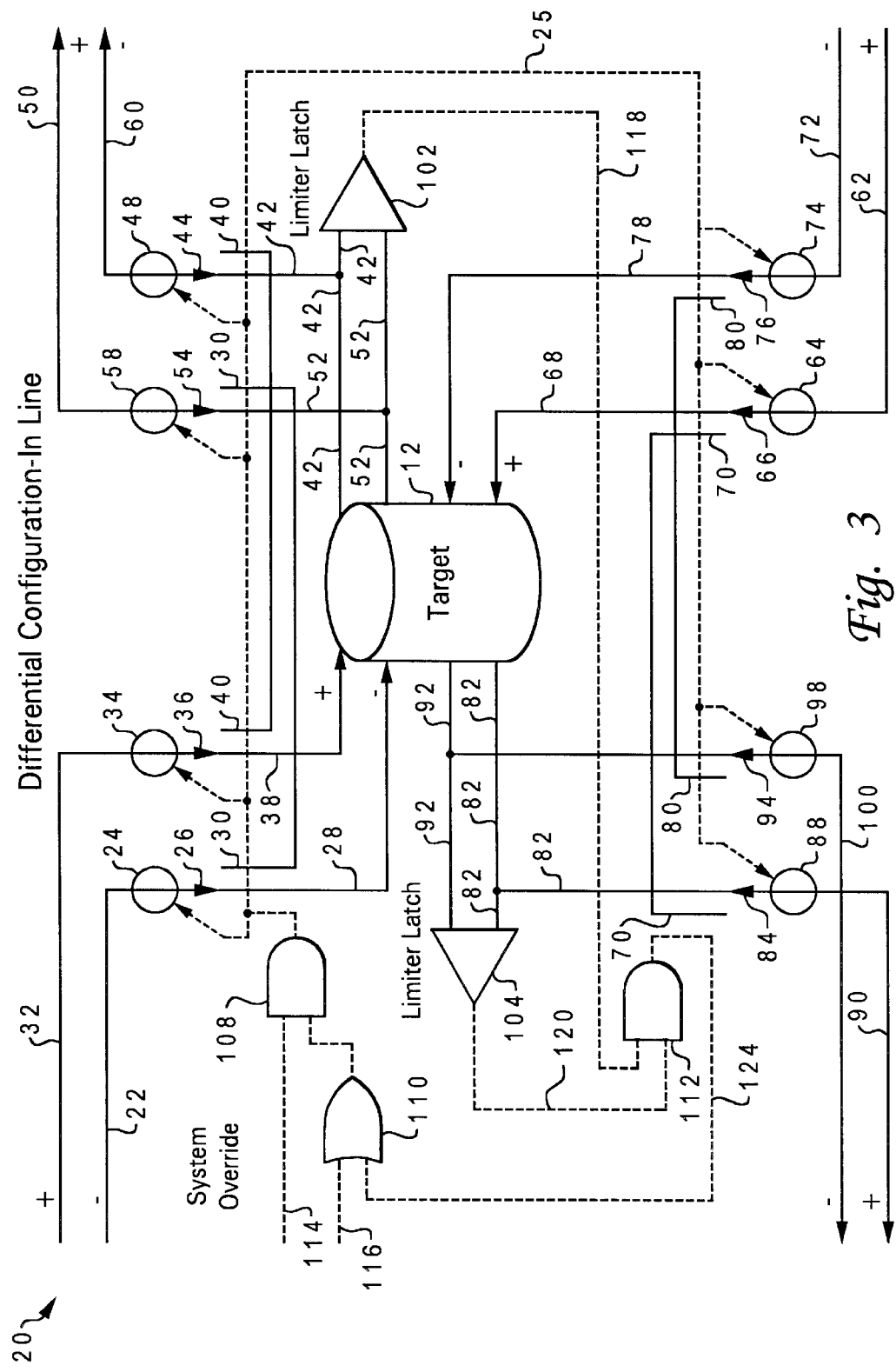
FIG. 3 is a more detailed block diagram of a self-healing coupler in an "in-line" mode wherein the self-healing coupler maintains the target disk drive as in-line and serially linked to the other devices.
Figure 4:
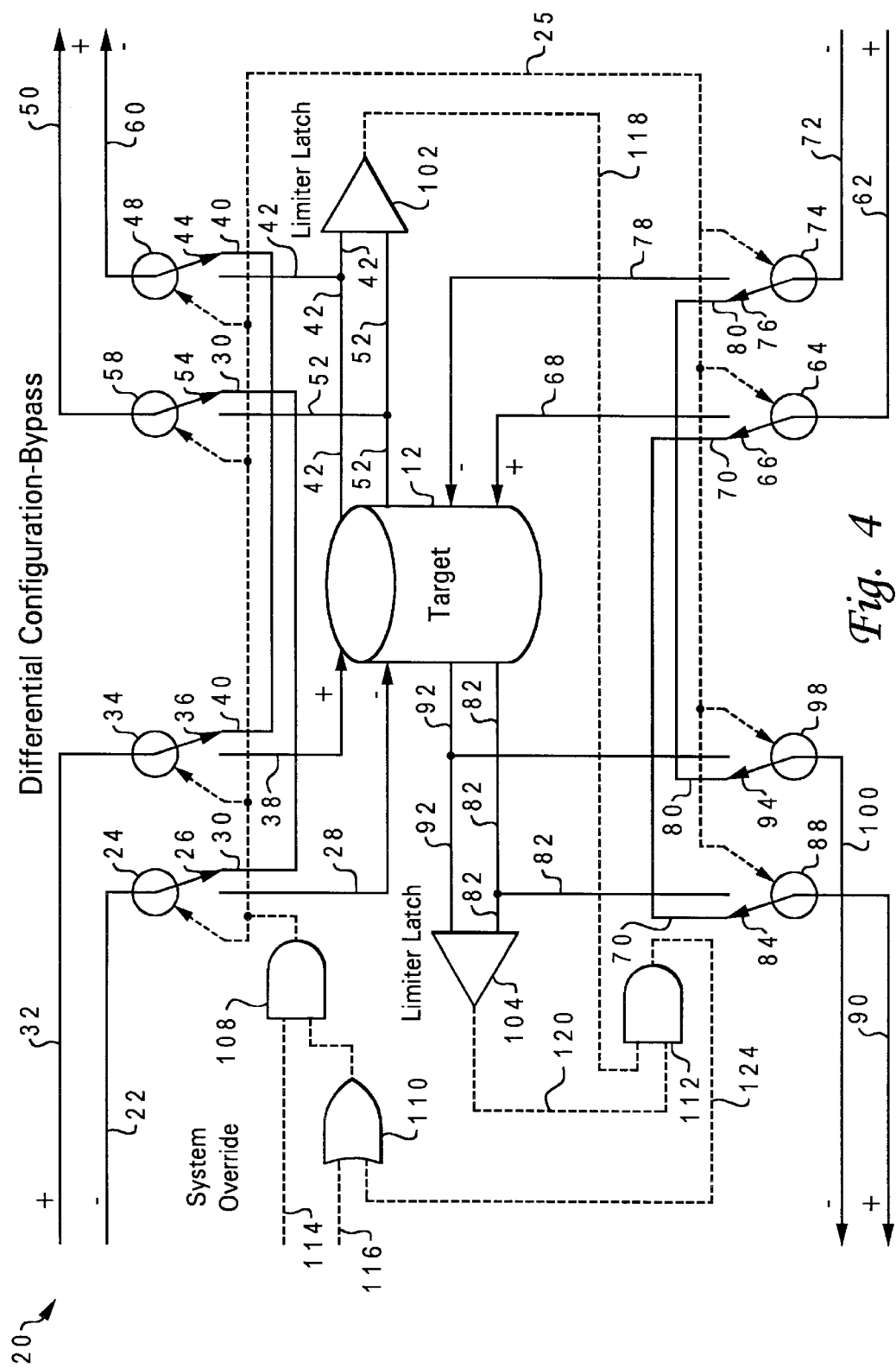
FIG. 4 is a more detailed block diagram of a self-healing coupler in a "by-pass" mode wherein the self-healing coupler by-passes the target disk drive and maintains the other devices as serially linked together when a break or problem in communication or link has occurred at the target disk drive.

FIG. 3 shows a detailed block diagram of a self-healing coupler 20 coupled to a target disk drive 12 wherein the self-healing coupler 20 is in the "in-line" mode, that is, the target disk drive 12 is "in-line" and serially linked to the other disk drives 12 and the initiator 14. FIG. 4 shows a detailed block diagram of a self-healing coupler 20 coupled to a target disk drive 12 wherein the self-healing coupler 20 is in the "by-pass" mode, that is, the target disk drive 12 is "by-passed" and the other disk drives 12 and the initiator 14 are maintained as serially linked together. The self-healing coupler 20 has a quad-pole, double throw switch 25.

The target disk drive 12 has bi-directional communication lines. The target disk drive 12 has one direction of communication lines running from an input series of positive lines from line 32 to line 38 and an output series of positive lines from line 42 to line 50, and an input series of negative lines from line 22 to line 28 and an output series of negative lines from line 52 to line 60. The target disk 12 also has another direction of communication lines running from an input series of positive lines from line 62 to line 68 and an output series of lines from line 82 to line 90 and an input series of negative lines from line 72 to line 78 and an output series of negative lines from line 92 to line 100.

A switching device is coupled to each of the input and output series of lines. FIGS. 3 and 4 show switching device 34 coupled to line 32, switching device 48 coupled to line 50, switching device 24 coupled to line 22, switching device 58 coupled to line 60, switching device 64 coupled to line 62, switching device 88 coupled to line 90, switching device 74 coupled to line 72, and switching device 98 coupled to line 100. A switch coupler 36 of switch device 34 is able to switch coupling line 32 between line 38 (in-line mode) and by-pass line 40 (by-pass mode) while a switch coupler 44 of switch device 48 is able to switch coupling line 50 between line 42 (in-line mode) and by-pass line 40 (by-pass mode). A switch coupler 26 of switch device 24 is able to switch coupling line 22 between line 28 (in-line mode) and by-pass line 30 (by-pass mode) while a switch coupler 54 of switch device 58 is able to switch coupling line 60 between line 52 (in-line mode) and by-pass line 30 (by-pass mode). A switch coupler 66 of switch device 64 is able to switch coupling line 62 between line 68 (in-line mode) and by-pass line 70 (by-pass mode) while a switch coupler 84 of switch device 88 is able to switch coupling line 90 between line 82 (in-line mode) and by-pass line 70 (by-pass mode). A switch coupler 76 of switch device 74 is able to switch coupling line 72 between line 78 (in-line mode) and by-pass line 80 (by-pass mode) while a switch coupler 94 of switch device 98 is able to switch coupling line 100 between line 92 (in-line mode) and by-pass line 80 (by-pass mode).

The switch 25 is coupled to each of the switch devices 34, 48, 24, 58, 64, 88, 74, and 98. The switch 25 is controlled to place the target disk drive 12 in either an "in-line" mode or a "by-pass" mode. The self-healing coupler 20 determines whether serial data is constantly or still going through the target disk drive 12. The self-healing coupler 20 examines the output communication streams from the target disk drive 12, that is, the output series of communication lines. Output series of communication lines 42 and 52 from the target disk drive 12 are inputted into a limiter latch 102, and output series of communication lines 82 and 92 are inputted into a limiter latch 104. The limiter latches 102 and 104 look for the constant serial data stream (8 to 10 bit encoding scheme). The output 118 from limiter latch 102 and the output 120 from limiter latch 104 are inputted into a series of logic gates to control the switch 25 in either an "in-line" mode or a "by-pass" mode. FIGS. 3 and 4 show an example of such series of logic gates. The outputs 118 and 120 from the limiter latches 102 and 104 are inputted into an AND gate 112. The output 124 of the AND gate 112 is inputted into an OR gate 110. Override system control is an input 116 into the OR gate 110. The output of the OR gate 110 is inputted into another AND gate 108. Another override system control is an input 114 into the AND gate 108 as well.

If the limiter latches 102 and 104 detect data stream flowing through the target disk drive 12, then they send signals to the series of logic gates to maintain or switch the switch 25 in the "in-line" mode. The switch 25 is maintained in or switched to the "in-line" mode as shown in FIG. 3. The switch couplers 36, 44, 26, and 54 of switch devices 34, 48, 24, and 58 are positioned or switched to respectively couple the lines 32 and 38, the lines 42 and 50, the lines 22 and 28, and the lines 52 and 60 in "in-line" communication. Furthermore, the switch couplers 66, 84, 76, and 94 of switch devices 64, 88, 74, and 98 are positioned or switched to respectively couple the lines 62 and 68, the lines 82 and 90, the lines 72 and 78, and the lines 92 and 100 in "in-line" communication. Therefore, the lines of communications for the target disk drive 12 shown in FIG. 3 are in "in-line" communications.

On the other hand, if the limiter latches 102 and/or 104 detect no data stream flowing through the target disk drive 12, then the latch(es) 102 and/or 104 send signals to the series of logic gates to maintain or switch the switch 25 to the "by-pass" mode. The switch 25 is maintained in or switched to the "by-pass" mode as shown in FIG. 4. The switch couplers 36, 44, 26, and 54 of switch devices 34, 48, 24, and 58 are positioned or switched to respectively couple the line 32 and by-pass line 40, the line 50 and by-pass line 40, the line 22 and by-pass line 30, and the line 60 and by-pass line 30 in "by-passing" communication to and from the target disk drive 12 while allowing other devices to be maintained in serial link through the by-pass lines 40 and 30. Furthermore, the switch couplers 66, 84, 76, and 94 of switch devices 64, 88, 74, and 98 are positioned or switched to respectively couple the line 62 and by-pass line 70, the line 90 and by-pass line 70, the line 72 and by-pass line 80, and the line 100 and by-pass line 80 in "by-passing" communication to and from the target disk drive 12 while allowing other devices to be maintained in serial link through the by-pass lines 70 and 80. Therefore, the lines of communications for the target disk drive 12 shown in FIG. 4 have been by-passed and the other devices are maintained in serial link to each other through the by-pass lines 30, 40, 70, and 80.

The self-healing coupler 20 has a system for overriding the automatic coupling of the target disk drive 12 in a respective "in-line" or "by-pass" mode.

The self-healing feature of the coupler 20 is overridden by placing appropriate override values at input 114 of the AND gate 108 and at input 116 of the OR gate 110. The overriding of the self-healing coupler 20 allows a system or person to control and maintain the respective target disk drive 12 in a desired "in-line" or "by-pass" mode instead of allowing the self-healing coupler 20.

While the invention has been particularly shown and described with reference to a preferred embodiment, it will be understood by those skilled in the art that various changes in form and detail may be made therein without departing from the spirit and scope of the invention.

What is claimed is:

1. A self-healing coupler for a serially linked device that is serially coupled to other devices wherein the serially linked device has a communication input and a communication output, comprising:
   at least one switching device coupled to the communication input and the communication output of the serially linked device,
   a communication detection device coupled to the communication output of serially linked device for detecting continuous communication at the communication output, and
   a switch coupled to the at least one switching device wherein the switch controls the at least one switching device so that the serially linked device is maintained linked and in an in-line position to the other devices when the continuous communication has been detected at the communication output and so that the serially linked device is in a by-pass position from the other devices and the other devices are maintained as serially linked together when the continuous communication has not been detected at the communication output.

2. The self-healing coupler according to claim 1 wherein the serially linked device has bi-directional communication lines and wherein a pair of polarized communication lines provide communication in one direction through the serially linked device and another pair of polarized communication lines provide communication in another direction through the serially linked device.

3. The self-healing coupler according to claim 2 wherein the at least one switching device is a switching device coupled to each of the communication lines.

4. The self-healing coupler according to claim 2 wherein the switch is a quad-pole double throw switch coupled to the at least one switching device.

5. The self-healing coupler according to claim 1 wherein the communication detection device is at least one limiter latch coupled to the communication output wherein the at least one limiter latch detects the continuous communication at the communication output.

6. The self-healing coupler according to claim 5 wherein the at least one limiter latch is two limiter latches and one of the two limiter latches is coupled to one direction of the communication output and another of the two limiter latches is coupled to another direction of the communication output.

7. The self-healing coupler according to claim 5 wherein the at least one limiter latch receives a constant serial data stream in detecting the continuous communication.

8. The self-healing coupler according to claim 1 further comprising:
   an override system coupled to the switch to allow manual control of the switch in controlling the at least one switching device to manually maintain the serially linked device between the in-line position and the by-pass position.

9. A method of self-healing a serial link for a device that is serially coupled to other devices wherein the serially linked device has a communication input and a communication output, comprising the steps of:
   coupling a self-healing coupler to the device and the other devices,
   detecting continuous communication at the communication output by the self-healing coupler,
   switching the self-healing coupler to an in-line mode so that the serially linked device is maintained linked and in an in-line position to the other devices when the self-healing coupler has detected continuous communication at the communication output, and
   switching the self-healing coupler to a by-pass mode so that the serially linked device is by-passed in being linked from the other devices and the other devices are maintained as serially linked together when the self-healing coupler has not detected the continuous communication at the communication output.

10. The method according to claim 9 wherein the continuous communication is bi-directional communication.

11. The method according to claim 10 wherein the detecting step further comprises the step of:
   using at least one limiter latch to monitor and detect the continuous communication.

12. The method according to claim 10 wherein the step of switching the self-healing coupler to an in-line mode further comprises the step of:
   coupling the device to bi-directional communication lines.

13. The method according to claim 12 wherein the step of switching the self-healing coupler to a by-pass mode further comprises the steps of:
   uncoupling the device from bi-directional communication lines, and
   coupling the bi-directional communication lines to by-pass communication lines.

14. The method according to claim 10 wherein the switching steps further comprises the step of:
   using a quad-pole double pole throw switch to switch the self-healing coupler between the in-line mode and the by-pass mode.

15. The method according to claim 9 further comprises the step of:
   overriding the switching steps, and
   manually controlling and switching the device between the in-line position and the by-pass position.

16. The self-healing coupler of claim 1, wherein said serially linked device is a Redundant Array of Inexpensive Disks (RAID) storage device.

17. The method of claim 9, wherein said serially linked device is a Redundant Array of Inexpensive Disks (RAID) storage device.

* * * * *